(12) United States Patent
Bryzgin et al.

(10) Patent No.: US 11,528,298 B2
(45) Date of Patent: Dec. 13, 2022

(54) METHODS AND SYSTEMS FOR PREVENTING MALICIOUS ACTIVITY IN A COMPUTER SYSTEM

(71) Applicant: TRUST LTD., Moscow (RU)

(72) Inventors: Andrei Bryzgin, Chelyabinsk (RU); Pavel Suprunyuk, Krasnogorsk (RU)

(73) Assignee: TRUST LTD., Moscow (RU)

( * ) Notice: Subject to any disclaimer, the term of this patent is extended or adjusted under 35 U.S.C. 154(b) by 0 days.

(21) Appl. No.: 17/314,954

(22) Filed: May 7, 2021

(65) Prior Publication Data

US 2022/0070219 A1 Mar. 3, 2022

(30) Foreign Application Priority Data

Aug. 27, 2020 (RU) .......................... RU2020128525

(51) Int. Cl.
*H04L 9/40* (2022.01)
*G06F 21/50* (2013.01)
(Continued)

(52) U.S. Cl.
CPC .......... *H04L 63/1491* (2013.01); *G06F 21/53* (2013.01); *G06F 21/50* (2013.01); *G06F 21/554* (2013.01); *G06F 21/56* (2013.01)

(58) Field of Classification Search
CPC ....... H04L 63/1491; H04L 9/40; G06F 21/55; G06F 21/50; G06F 21/53; G06F 21/554; G06F 21/56
See application file for complete search history.

(56) References Cited

U.S. PATENT DOCUMENTS 7,587,594 B1 * 9/2009 Kavalam ............... H04L 63/102
713/167
7,603,713 B1 10/2009 Belov
(Continued)

FOREIGN PATENT DOCUMENTS

RU 2011114863 A 10/2012
RU 2514141 C1 4/2014

OTHER PUBLICATIONS

Search Report with regard to the counterpart RU Patent Application No. 2020128525 completed Mar. 2, 2021.
(Continued)

*Primary Examiner* — Jayesh M Jhaveri
(74) *Attorney, Agent, or Firm* — BCF LLP (57) ABSTRACT

A method and a system for preventing an activity of a malware application in a computer system are provided. The method comprising: receiving at least one artefact of a sandbox environment to be installed in the computer system for simulating the sandbox environment in the computer system; receiving an indication of at least one interaction of a given application with the at least one artefact; analyzing an activity of the given application to detect at least one of a first type event and a second type event triggered thereby after executing the at least one interaction; in response to the analyzing rendering a positive result: identifying the given application as being the malware application; and using data indicative of a digital footprint of the given application in the computer system for further updating the at least one artefact for further preventing the activity of the malware application.

16 Claims, 4 Drawing Sheets

(51) Int. Cl.
  *G06F 21/53* (2013.01)
  *G06F 21/55* (2013.01)
  *G06F 21/56* (2013.01)

(56) References Cited

U.S. PATENT DOCUMENTS

| | | | |
|---|---|---|---|
| 8,464,345 | B2 | 6/2013 | Satish et al. |
| 10,339,300 | B2* | 7/2019 | Shraim .................... G06F 21/53 |
| 2008/0016339 | A1* | 1/2008 | Shukla .................... G06F 21/54 |
| | | | 713/164 |
| 2008/0155338 | A1 | 6/2008 | Rusmanov |
| 2008/0178144 | A1 | 7/2008 | Bazigos et al. |
| 2011/0225655 | A1 | 9/2011 | Niemelae et al. |
| 2014/0215269 | A1 | 7/2014 | Sung |
| 2018/0276370 | A1* | 9/2018 | Mesropian ............ G06F 21/566 |
| 2019/0158525 | A1* | 5/2019 | Rostami-Hesarsorkh ................... |
| | | | G06F 21/566 |
| 2020/0287919 | A1* | 9/2020 | Ravindranath ......... H04L 41/16 |
| 2021/0194853 | A1* | 6/2021 | Xiao ................... H04L 63/0281 |

OTHER PUBLICATIONS

English Abstract for RU2011114863 retrieved on Espacenet on May 6, 2021.

* cited by examiner

METHODS AND SYSTEMS FOR PREVENTING MALICIOUS ACTIVITY IN A COMPUTER SYSTEM

CROSS-REFERENCE

The present application claims priority to a Russian Patent Application No.: 2020128525, entitled "METHODS AND SYSTEMS FOR PREVENTING MALICIOUS ACTIVITY IN A COMPUTER SYSTEM", filed on Aug. 27, 2020, the entirety of which is incorporated herein by reference.

FIELD

The present technology relates broadly to the field of cyber security; and more specifically, to methods and systems for preventing activity of malicious software (malware) in a computer system by simulating a sandbox environment therein.

BACKGROUND

As used herein, malicious software (malware) is a collective term referring to a malicious software application or code configured to damage a computer system. More specifically, the malware may be configured to penetrate the computer system, inflict damage, take over control of some processes, or completely disable computing devices of the computer system, including, for example, computers, networks devices, tablets and mobile devices.

Certain prior art approaches have been proposed to tackle the problem of detecting and preventing activity of malware.

U.S. Pat. No. 8,464,345-B2 issued on Jun. 11, 2013, assigned to CAI Software LLC, and entitled "Behavioral Signature Generation Using Clustering" discloses generating a behavioral signature for detecting malware. A computer is used to collect behavior traces of malware in a malware dataset. The behavior traces describe sequential behaviors performed by the malware. The behavior traces are normalized to produce malware behavior sequences. Similar malware behavior sequences are clustered together. The malware behavior sequences in a cluster describe behaviors of a malware family. The cluster is analyzed to identify a behavior subsequence common to the cluster's malware family. A behavior signature for the malware family is generated using the behavior subsequence. A trace of new malware is normalized and aligned with an existing cluster, if possible. The behavioral signature for that cluster is generated based on the behavior sequence of the new malware and the other sequences in the cluster.

Russian Patent No.: 2,514,141-C1 issued on Apr. 27, 2014, assigned to Kaspersky Lab AO, and entitled "Method of Emulating System Function Calls for Evading Emulation Countermeasures" discloses methods of emulating system function calls for evading emulation countermeasures. The result is achieved through a method of emulating system function calls to evade emulation countermeasures, the method comprising the following steps: obtaining an executable file at the input of an emulator; verifying conditions of system function call emulation requirements; if at least one of the above-mentioned conditions is satisfied, using system call emulation; emulating execution of the executable file according to successive execution of instructions; upon detecting a system function call, switching the emulation process to system call emulation; performing system function call emulation in form of a chain of low-level calls.

U.S. Pat. No. 7,603,713-B1 issued on Oct. 13, 2009, assigned to Kaspersky Lab AO, and entitled "Method for Accelerating Hardware Emulator Used for Malware Detection and Analysis" discloses a method and system for accelerating malware emulator by using an accelerator. The accelerator allows for a potentially malicious component (i.e., process) containing dummy processes to be executed in a real CPU of a computer system using its operating memory. A special memory area is allocated for the process based on the memory requested by the process in the emulator. The state of the CPU and the memory is loaded in the emulator prior to executing the suspicious process. The system can be restored to its initial state in case of malicious actions performed by the process. The dummy instructions of the process are processed by the CPU at its own speed and as soon as the process performs a malicious instruction it is stopped by the emulator. The emulation process is accelerated to a speed of a regular CPU.

United States Patent Application Publication No.: 2011/225,655-A1 published on Sep. 15, 2011, assigned to F Secure Oyj, and entitled "Malware Protection" discloses a method of protecting a computer system from malware, which malware attempts to prevent detection or analysis when executed in an emulated computer system. The method comprises determining if an executable file should be identified as being legitimate and, if not, executing the executable file whilst providing indications to the executable file that it is being executed within an emulated computer system.

SUMMARY

It is an object of the present technology to provide a system and method for ameliorate at least some inconveniencies present in the prior art.

Developers of the present technology have appreciated that certain malware may be configured to be sensitive to specific program environments configured for determining that malware therein (also referred to herein as "sandbox environments"). More specifically, the malware may be configured, once determined a fact of being executed in a sandbox environment, cease its activity in order not to be detected by the sandbox environment.

Thus, the developers have realized that the sandbox environment may be simulated in the computer system such that the malware may misleadingly identify the computer system as being the simulated sandbox environment and abandon any further activity thereof.

Thus, non-limiting embodiments of the present technology are directed to methods and systems for preventing an activity of malware in the computer system by installing therein at least one artefact of the sandbox environment, thereby simulating the sandbox environment in the computer system.

Further, based on behavioral analysis of the malware, certain embodiments of the present technology can further be directed to accumulating knowledge about the at least one artifact and/or determining new ones identified during the operation of the malware in the computer systems allowing updating artefacts used for simulating the sandbox environment in a timely manner. Therefore, the methods and systems described herein may allow for more efficient identification of the activity of the malware in the computer system and thus more effective prevention thereof.

More specifically, in accordance with a first broad aspect of the present technology, there is provided a computer-implemented method for preventing an activity of a malware application in a computer system. The method is executable by a processor of the computer system. The method comprises: receiving, by the processor, at least one artefact of a sandbox environment to be installed in the computer system for simulating the sandbox environment in the computer system; receiving, by the processor, an indication of at least one interaction of a given application with the at least one artefact; analyzing, by the processor, an activity of the given application to detect at least one of a first type event and a second type event triggered thereby after executing the at least one interaction, the first type event being the given application aborting execution of any activity after the at least one interaction with the at least one artefact; and the second type event being the given application executing the activity thereof in a manner different from a predetermined manner of executing the activity associated with the given application; in response to the analyzing rendering a positive result: identifying the given application as being the malware application; and using data indicative of a digital footprint of the given application in the computer system for updating the at least one artefact for further preventing the activity of the malware application.

In some implementations of the method, the at least one artefact comprises at least one of:

one or more files to be created at predetermined paths in the system; one or more language packs to be added to the computer system without adding corresponding keyboard layouts; one or more idle network interfaces with names, IP, and MAC addresses having predetermined names to be generated in the computer system; one or more idle processes to be launched at predetermined paths and under predetermined names; one or more predetermined keys to be added in a system register of the computer system; one or more predetermined respective interface elements to be generated and added to at least one of a launch menu and a quick launch panel of the computer system; and one or more environment variables associated with the sandbox environment to be registered with the computer system.

In some implementations of the method, the at least one artifact is one of an active artefact configured to interact with at least one application running in the computer system; and a passive artefact incapable of interacting with any application running therein.

In some implementations of the method, the analyzing further comprises determining if the given application is the malware application, the determining including at least one of searching for the given application on one of a whitelist and a blacklist of applications; determining if a predetermined respective weight of the at least one artefact, associated with triggering the at least one of the first type event and the second type event, exceeds a predetermined weight threshold; and determining at least one difference in behaviors of the given application in the sandbox environment and in the computer system.

In some implementations of the method, the method further comprises transmitting, via a communication network, the data indicative of the digital footprint of the given application to an analysis and update server, the transmitting being executed in an encrypted form.

In some implementations of the method, wherein the analysis and update server is configured to execute at least one of: analyzing the digital footprint of the given application; adding the at least one artefact to an artifact database associated with the sandbox environment; and transmitting updates of the artifact database to the computer system.

In some implementations of the method, the at least one artifact is being updated based on monitoring data from at least one of the following subsystems: a file system, a list of running processes, and a registry; and the method further comprises updating a status of the at least one artifact, the status including at least one of: adding, removing, and modifying.

In some implementations of the method, the receiving of the at least one artefact is from the analysis and update server.

In accordance with a second broad aspect of the present technology, there is provided a computer system for preventing an activity of a malware application therein. The computer system includes: a processor and a non-transitory computer-readable memory storing instructions. The processor, upon executing the instructions, is configured to: receive at least one artefact of a sandbox environment to be installed in the computer system for simulating the sandbox environment in the computer system, receive an indication of at least one interaction of a given application with the at least one artefact; analyze an activity of the given application to detect at least one of a first type event and a second type event triggered thereby after executing the at least one interaction, the first type event being the given application aborting execution of any activity after the at least one interaction with the at least one artefact; and the second type event being the given application executing the activity thereof in a manner different from a predetermined manner of executing the activity associated with the given application; in response to analyzing rendering a positive result: identify the given application as being the malware application; and use data indicative of a digital footprint of the given application in the computer system for updating the at least one artefact for further preventing the activity of the malware application.

In some implementations of the system, the at least one artefact comprises at least one of: one or more files to be created at predetermined paths in the system; one or more language packs to be added to the computer system without adding corresponding keyboard layouts; one or more idle network interfaces with names, IP, and MAC addresses having predetermined names to be generated in the computer system; one or more idle processes to be launched at predetermined paths and under predetermined names; one or more predetermined keys to be added in a system register of the computer system; one or more predetermined respective interface elements to be generated and added to at least one of a launch menu and a quick launch panel of the computer system; and one or more environment variables associated with the sandbox environment to be registered with the computer system.

In some implementations of the system, the at least one artifact is one of an active artefact configured to interact with at least one application running in the computer system; and a passive artefact incapable of interacting with any application running therein.

In some implementations of the system, the processor, configured to analyze the activity of the given application, is further configured to determine if the given application is the malware application, by executing at least one of searching for the given application on one of a whitelist and a blacklist of applications; determining if a predetermined respective weight of the at least one artefact, associated with triggering the at least one of the first type event and the second type event, exceeds a predetermined weight threshold; and determining at least one difference in behaviors of the given application in the sandbox environment and in the computer system.

In some implementations of the system, the processor is further configured to transmit, via a communication network, in an encrypted form, the data indicative of the digital footprint of the given application to an analysis and update server.

In some implementations of the system, the analysis and update server is configured to execute at least one of analyzing the digital footprint of the given application; adding the at least one artefact to an artifact database associated with the sandbox environment; and transmitting updates of the artifact database to the computer system.

In some implementations of the system, the at least one artifact being updated based on monitoring data from at least one of the following subsystems: a file system, a list of running processes, and a registry; and the processor is further configured to update a status of the at least one artifact, the status including at least one of adding, removing, and modifying.

In some implementations of the system, the processor is configured to receive the at least one artefact from the analysis and update server.

In the context of the present specification, "mechanisms of abnormal termination" of a given malware application in a computer system denote certain methods and actions that the given malware is configured to use for independent unscheduled termination of a current activity thereof in the computer system without executing its main functionality for which the given malware was created, for example, without limitation, conducting a cyber-attack in the computer system, compromising safety of data stored in the computer system, and the like.

In the context of this specification, a "sandbox environment" means any environment that can be used by malware researchers (analysts) to determine characteristics, functionality, and purpose of respective types of malware.

In the context of this application, a "digital footprint" of a given malware application in a computer system means all recorded events and checks of the malware application that trigger an abnormal termination of the malware application or causes the malware application to change a manner of executing its current activity in the computer system.

In the context of the present specification, unless expressly provided otherwise, a computer system may refer, but is not limited to, a "computing device", an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology will be described with reference to the accompanying drawings, which are presented to explain the essence of the technology and in no way to limit the scope of the present technology, wherein.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to methods and systems for preventing activity of a malware application in a computer system including simulating a sandbox environment, which is configured to detect the malware application.

More specifically, the methods and systems described herein are directed to monitoring behavior of a given application running in the computer system, for example, for indications of using abnormal termination mechanisms, which developers of the given application may have embedded in an executable code of the given application in case the it is launched in the sandbox environment.

It should be noted that some non-limiting embodiments of the present technology are based on a premise that some malware applications are configured to avoid executing their malicious functionality in sandbox environments in order to hide or change their malicious behavior and thus avoid being detected.

Further, as it can be appreciated, the malware application can be configured to detect the sandbox environment by a number of typical features (hereinafter referred to as artifacts), including, but not limited to, checks for the presence of certain files, running processes, system registry keys, network interfaces with specific addresses typical to sandbox environments. The presence of these artifacts in the computer system is typically due to the sandbox environment being created based on an operating system running in a virtual machine.

Thus, according to certain non-limiting embodiments of the present technology, the methods for preventing the activity of the malware application described herein may include pre-introducing artifacts of the sandbox environment into the computer system to be protected, which the malware application can detect, and initiate, for example, the abnormal termination mechanisms aborting any further activity thereof. Thus, the malware application will not execute its malicious functionality in the computer system being protected. Further, it is important to note that the computer system being protected does not need to actively check the files being launched and/or interfere with the operation thereof, which may reduce hardware resources (primarily RAM and CPU power) of the computer system.

System

Figure 1:
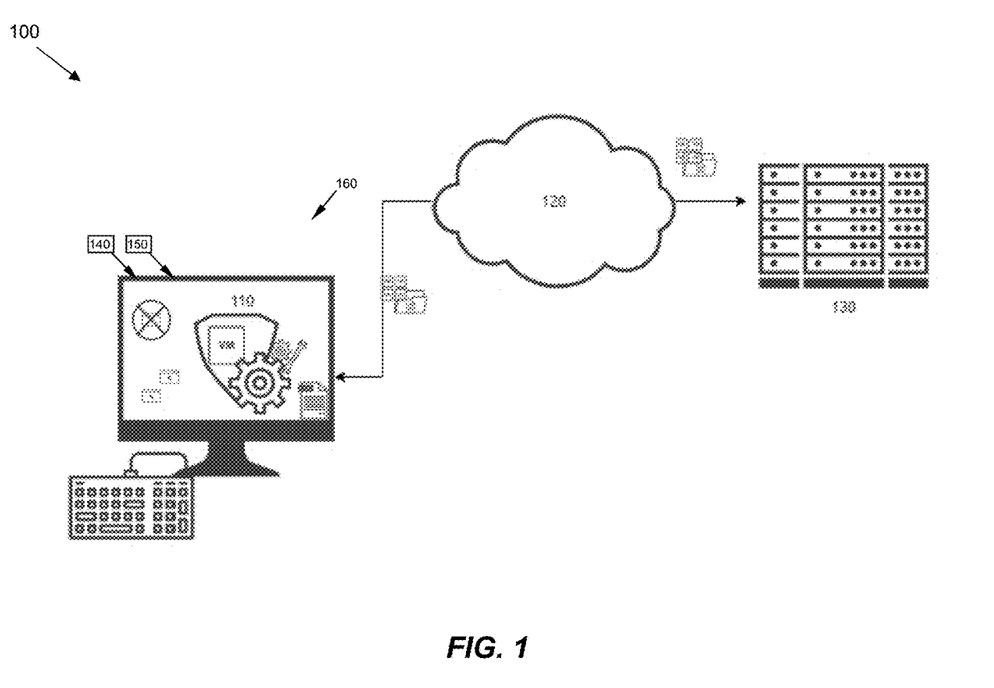
FIG. 1 depicts a schematic diagram of a system for preventing an activity of a malware application, in accordance with certain non-limiting embodiments of the present technology.

With reference to FIG. 1, there is depicted a schematic diagram of a system 100 used for preventing the activity of the malware application, in accordance with certain non-limiting embodiments of the present technology.

In some non-limiting embodiments of the present technology, the system 100 may comprise a computer system 160 of a user and a server 130 communicatively coupled to the computer system 160 via a network 120. In some non-limiting embodiments of the present technology, the computer system 160 may be protected from the activity of the malware.

In some non-limiting embodiments of the present technology, the network 120 is the Internet and/or an Intranet. Other implementations of the network 120, such as a local area network (LAN), a wide area network (WAN), and the like, can be appreciated by those skilled in the art. Further, the implementation of a respective communication link (not separately labelled) between each one of the computer system 160 and the server 130, and the network 120 depends, inter alia, on how each one of the computer system 160 and the server 130 is implemented, and may include, but not limited to, a primary communication channel and/or a wireless communication channel (such as a Wi-Fi network communication channel, 3G/4G communication channel, etc.).

Further, in some non-limiting embodiments of the present technology, the server 130 can be implemented as a conventional computer server and may thus comprise some or all of the components of a computing environment 400 of FIG. 4 (described in greater detail below). As a non-limiting example, the server 130 can be implemented as a Dell™ PowerEdge™ Server running the Microsof™ Windows Server™ operating system. Needless to say, the server 130 can be implemented in any other suitable hardware and/or software and/or firmware or a combination thereof. In the depicted non-limiting embodiment of the present technology, the server 130 is a single server. In alternative non-limiting embodiments of the present technology, the functionality of the server 130 may be distributed and may be implemented via multiple servers.

Further, according to various non-limiting embodiments of the present technology, the computer system 160 to be protected may be implemented as user electronic device including hardware running appropriate software suitable for executing a relevant task at hand, including, without limitation, one of a personal computer, a laptop, an a smartphone, as an example. To that end, the respective electronic device may include some or all the components of the computing environment 400 depicted in FIG. 4.

According to certain non-limiting embodiments of the present technology, the computer system 160 may include a simulation module 110 pre-installed therein for simulating the sandbox environment. To that end, in some non-limiting embodiments of the present technology, the simulation module 110 can be configured to receive, generate, and update artifacts of the sandbox environment in the computer system 160.

More specifically, in some embodiments, the simulation module 110 may be configured to receive artefacts for installation thereof in the computer system 160 from the server 130 via the network 120. In other non-limiting embodiments of the present technology, the simulation module 110 may receive artifacts for the computer system 160 from a computer-readable storage medium of the computer system 160, such as a storage 403 of the computing environment 400.

Further, in some non-limiting embodiments of the present technology, the simulation module 110 may be configured to generate artifacts according to an internal database for description of artifacts received from the server 130. Further, the simulation module 110 may be configured to check statuses and availability of latest versions of the artifacts in the computer system 160. It should be noted, by way of example, but not limited thereto, that the following options for initializing the check may be used: when starting the computer system 160, when launching the simulation module 110, or from time to time, such as according to a predetermined schedule. Further, if active artifacts, currently installed in the computer system 160, do not match the set from the internal database received from the server 130, the simulation module 110 may be configured to generate missing artifacts.

Accordingly, the simulation module 110 can be configured to download all necessary artifact updates from the server 130; however, in some non-limiting embodiments of the present technology, updates may also be installed manually, directly in the computer system 160.

In some non-limiting embodiments of the present technology, the internal database hosted by the server 130 may store at least some of the following data: the latest data on the current states of artifacts, description thereof, whitelists, blacklists, exclusion lists, etc. Furthermore, the server 130 may have an interface into which the artifacts can be loaded in a manual or automated interface.

Also, in some non-limiting embodiments of the present technology, the simulation module 110 associated with the sandbox environment can be configured to operate without the server 130, that is, as an independent functional unit.

Further, in some non-limiting embodiments of the present technology, the computer system 160 may include an event capturing module 140. In these embodiments, the event capturing module may be configured to track changes in the computer system 150 in response to applications interacting with at least one artefact of the sandbox environment, as will be described in greater detail below. Further, the event capturing module 140 may be configured to determine if a given application having interacted with the at least one artefact is the malware application. In this regard, in some non-limiting embodiments of the present technology, the event capturing module 140 may further be configured to perform at least one check for maliciousness of the given application having triggered at least one of a first type event and a second type event in the computer system 160 following interacting with the at least one artefact of the sandbox environment.

In certain non-limiting embodiments of the present technology, the first type event may be abnormal termination of the given application, that is, aborting any further activity of the given application after interacting with the at least one artefact. Further, the second type event may include changing a predetermined manner of executing further activity by the given application after interacting with the at least one artefact.

Further, in some non-limiting embodiments of the present technology, the computer system 160 may further include a digital footprint collecting module 150 configured to (1) collect malware's digital footprints of the malware application after identification thereof; (2) record all events and checks initiated by the malware application to determine its execution environment, and (3) further send the digital footprints over the network 120 to the server 130 for further analysis.

Method

Figure 2:
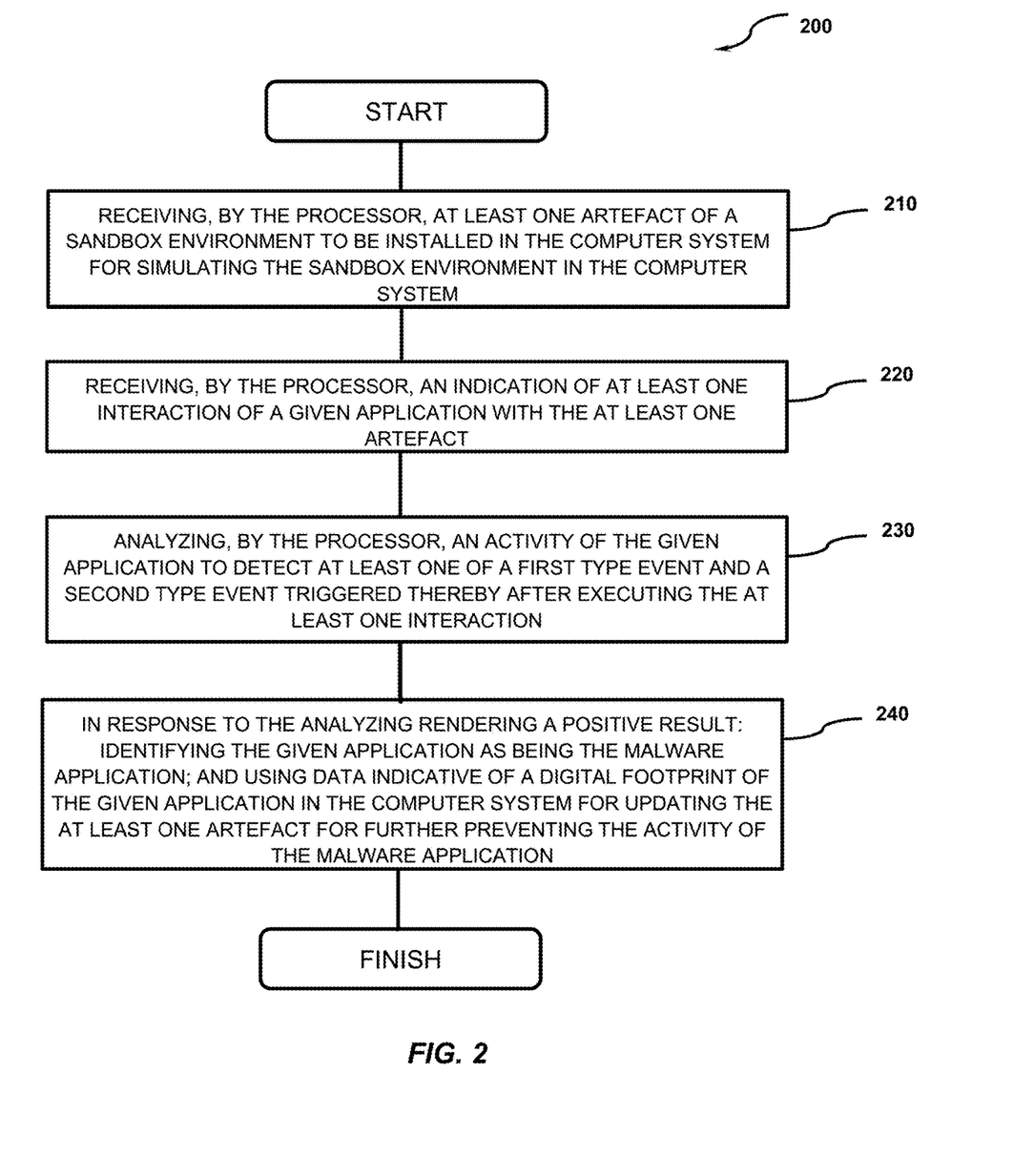
FIG. 2 depicts a flowchart of a method of preventing the activity of the malware application, in accordance with certain non-limiting embodiments of the present technology.

With reference to FIG. 2, there is depicted a flowchart diagram of a method 200 for preventing the activity of the malware application, in accordance with certain non-limiting embodiments of the present technology. The method 200 may be executed by a processor 401 of the computing environment 400.

Step 210: Receiving, by the Processor, at Least One Artefact of A Sandbox Environment to be Installed in the Computer System for Simulating the Sandbox Environment in the Computer System The method 200 begins at step 210, wherein the processor 401 is configured to receive the at least one artefact of the sandbox environment configurable for detecting the malware application. Further, in some non-limiting embodiments of the present technology, the processor 401 can be configured to install the at least one artifact into the computer system 160. By so doing, the processor 401 can be configured to simulate the sandbox environment in the computer system 160.

As mentioned above, any sandbox environment may use some specific hardware that is not characteristic of real systems, that is, the computer system 160. This includes a video adapter, a hard drive, processor IDs, a BIOS version, a MAC address of a network card. Furthermore, the sandbox environment may leave traces on the computer system 160 in the form of running auxiliary processes, drivers, and other specific objects, such as registry keys, which are characteristic only of virtual machines. Thus, in order to simulate the launch of the malware application in the sandbox environment, the processor 401 can be configured to add such artifacts that are indicative of those traces of the sandbox environment in the computer system 160.

Further, in some non-limiting embodiments of the present technology, the at least one artifact can be one of a passive artifact and an active artifact. In the context of the present specification, the "passive artefact" installed in the computer system 160 denotes an artefact which is merely present in the computer system 160 without being capable of interacting with any application running in the computer system 160. By way of example, and in no way as a limitation, the passive artefact may include at least one of one or more files to be created at predetermined paths in the computer system 160; one or more language packs to be added to the computer system 160 without adding corresponding keyboard layouts; one or more idle network interfaces with names, IP, and MAC addresses having predetermined names to be generated in the computer system 160; one or more idle processes to be launched at predetermined paths and under predetermined names; one or more predetermined keys to be added in a system register of the computer system 160; one or more predetermined respective interface elements to be generated and added to at least one of a launch menu and a quick launch panel of the computer system 160; and one or more environment variables associated with the sandbox environment to be registered with the computer system 160.

For ease of understanding of the present technology, more detailed examples of passive artifacts will be given immediately below.

In some non-limiting embodiments of the present technology, in order to simulate the sandbox environment, the processor 401 can be configured to create at least one file at a respective predetermined path, the respective predetermined path being a file path characteristic of files of the sandbox environment (for example, a virtual machine).

Thus, the processor 401 can be configured to create the at least one file in the computer system 160 at the respective predetermined path that indicate the presence, in the computer system 160, of the virtual machine. By way of example, but not limited thereto, to simulate one of the following sandbox environments, the processor 401 can be configured to create respective files at one of the following respective predetermined paths in the computer system 160:

1. VMware (© 2020 VMware, Inc),
C:\Windows\System32\Drivers\Vmmouse.sys
C:\Windows\System32\Drivers\vm3dgl.dll
C:\Windows\System32\Drivers\vmdum.dll
C:\Windows\System32\Drivers\vm3dver.dll
C:\Windows\System32\Drivers\vmtray.dll
C Windows System32\Drivers\VMToolsHook.dll
C:\Windows\System32\Drivers\vmmousever.dll
C:\Windows\System32\Drivers\vmhgfs.dll
C:\Windows\System32\Drivers\vmGuestLib.dll
C:\Windows\System32\Drivers\VmGuestLibJava.dll
C:\Windows\System32 Driversvmhgfs.dll
2. VirtualBox (© 2020 Oracle),
C:\Windows\System32\Drivers\VBoxMouse.sys
C:\Windows\System32\Drivers\VBoxGuest.sys
C:\Windows\System32\Drivers\VBoxSF.sys
C:\Windows System32\Drivers\VBoxVideo.sys
C:\Windows\System32\vboxdisp.dll
C:\Windows\System32\vboxhook.dll
C:\Windows\System32\vboxmrxnp.dll
C:\Windows\System32\vboxogl.dll
C:\Windows\System32\vboxoglarrayspu.dll
C:\Windows\System32\vboxoglcrutil.dll
C:\Windows\System32\vboxoglerrorspu.dll
C:\Windows\System32\vboxoglfeedbackspu.dll
C:\Windows\System32\vboxoglpackspu.dll
C:\Windows\System32\vboxoglpassthroughspu.dll
C:\Windows\System32\vboxservice.exe
C:\Windows\System32\vboxtray.exe
C:\Windows\System32\VBoxControl.exe In some non-limiting embodiments of the present technology, to simulate the sandbox environment, the processor 401 can further be configured to add, in the computer system 160, non-functional network interfaces with names, IP and MAC addresses corresponding to common sandbox environments.

By way of example, but not limited thereto, the processor 401 can be configured to change, in the computer system 160, the first three octets (or 24 bits) of the MAC address of a network adapter to those representative of a vendor of the sandbox environment (virtual machines), i.e., the processor

401 can be configured to change, for example, 00:0C:29:XX:XX:XX,00:1C:14:XX:XX:XX,00:05:69:XX:XX:XX, 00:50:56:XX:XX:XX to simulate the VMWare sandbox environment or 08:00:27:XX:XX:XX to simulate the Virtual Box sandbox environment.

Further, in some non-limiting embodiments of the present technology, to simulate the sandbox environment, the processor 401 can also be configured to launch one or more idle processes at predetermined paths and under predetermined names, in such a way that these idle processes consume minimum possible amount of system resources of the computer system 160.

For example, depending on a particular implementation of the sandbox environment, the processor 401 can be configured to launch the following idle processes in the computer system 160:
- to simulate the VMware-based sandbox environment: Vmtoolsd.exe, Vmwaretrat.exe, Vmwareuser.exe, Vmacthlp.exe;
- to simulate the VirtualBox-based sandbox environment: vboxservice.exe and vboxtray.exe.

Furthermore, in additional non-limiting embodiments of the present technology, the processor 401 can be configured to launch services that are indicative of operation of the sandbox environment. For example, in those embodiments where the sandbox environment is the VMware sandbox environment, the processor 401 can be configured to launch at least one of: VMTools, Vmhgfs, VMMEMCTL, Vmmouse, Vmrawdsk, Vmusbmouse, Vmvss, Vmscsi, Vmxnet, vmx_svga, Vmware tools, Vmware physical disk auxiliary service, and the like.

Further, in some non-limiting embodiments of the present technology, to simulate the sandbox environment, the processor 401 can further be configured to add, in the system register of the computer system 160, one or more system register keys indicative of operating the sandbox environment. For example, in those embodiments where the sandbox environment is the VMware sandbox environment, the processor 401 can be configured to add at least one of the following keys in the system register of the computer system 160:
HKLM\SOFTWARE\Vmware Inc.\\\Vmware
HKEY_LOCAL_MACHINE\HARDWARE\DEVICE-MAP\Scsi\Scsi Port 2\Scsi Bus 0\Target Id 0\Logic Unit Id 0\Identifier
HKLM\SOFTWARE\Vmware Inc.\Vmware Tools
SYSTEM\CurrentControlSet\Enum\SCSI\Disk & Ven_VMware_& Prod_VMware_Virtual_S
SYSTEM\CurrentControlSet\Control\CriticalDeviceDatabase\root # vmwvmcihostdev
SYSTEM\CurrentControlSet\Control\VirtualDeviceDrivers Also, to simulate the sandbox environment in the computer system 160, in some non-limiting embodiments of the present technology, the processor 401 can be configured to generate software launch menu items, including quick launch items. For example, for VMware-based sandbox environments, the processor 401 can be configured to execute, in the computer system 160, at least one of Vmware Tools Tray, vmtoolsd.exe or VBoxTray.exe VBoxService.exe, prl_cc.exe or prl_tools.exe, SharedIntApp.exe (for Parallels Workstation); for Virtual PC, the processor 401 can be configured to generate at least one of vmusrvc.exe and vmsrvc.exe, as an example.

As noted above, according to certain non-limiting embodiments of the present technology, the at least one artefact for simulating the sandbox environment in the computer system 160 can be an active artefact. In the context of the present technology the "active artefact" denotes an artefact installable in the computer system 160 which is configured to interact with at least one application currently running in the computer system 160. Such applications may include, for example, at least one of operating system (OS) kernel-level software applications, and user-level plugins in the format of dynamic libraries.

Thus, as it can be appreciated, one of purposes of the active artifacts may be to deliberately distort the service information requested by the given application running in the computer system 160. As an example, but not limited thereto, if the given application may be able to determine a number of files stored on a desktop of the computer system 160. Further, if the number is small, i.e., around 2-4 files, and if the given application is the malware application, it may identify the computer system 160 as being the sandbox environment, and thus terminate. To simulate the described situation, the processor 401 can be configured to install an appropriate artifact, i.e., for example, a shared library interceptor function, which is loaded into each process launched and each time the malware application attempts to request the number of files on the desktop from the operating system, the interceptor function responds with a predetermined number of files, without reference to the real quantity thereof.

It should be noted that due to possible interference with the operation of legitimate software, the operation of a group of active artifacts requires the presence of a functionality that provides for the creation of exceptions. Thus, if a software is found on the list of exceptions, the processor 401 may be configured not to execute data substitution, and the software may thus request the real data about the system without distortion.

Further, in some non-limiting embodiments of the present technology, the processor 401 can be configured to use an IP address of the sandbox environment (virtual machine), different from that of the real host by IP timestamp, as an active artifact of the sandbox environment. This is due to the fact that virtual machines run on the host's physical hardware in a time-sharing manner, and a virtual machine cannot duplicate the synchronization action of a physical machine, even if the virtual machine uses multiple techniques to minimize and hide differences in synchronization performance. Timestamps are 32 bits of milliseconds since midnight UT and are used in various network protocols such as IP, ICMP, and TCP. IP timestamp parameters are variable length data stored in the IP header and associated with a specific type of extension.

Based on this, the processor 401 can be configured to inject time delays and edit IP timestamps in outgoing packets in the computer system 160. Thus, when packets containing the edited IP timestamp are detected in the computer system 160, there is a delay before sending the packets for processing. Moreover, it should be noted that the settings and duration of the average number of repetitions of the same IP timestamp in the computer system 160 are set in accordance with identical tags (IP timestamp) in sandbox environments (virtual machines).

In these embodiments, parameters of the IP timestamp can be determined by experimental methods using test samples in order to simulate the sandbox environment as accurately as possible. In some non-limiting embodiments of the present technology, the processor 401 can be configured to determine the IP timestamps using a machine-learning algorithm trained based on training sets of data generated based on examining packets of the sandbox environment.

It is worth noting that the processor 401 can be configured to receive the at least one artifact for installation thereof in the computer system 160 in the form of non-executable files, which contain artifact definitions, consisting of expressions and blocks of data that specify which components should be installed on the virtual machine using the computer system 160. For example, such a file may define the name of the at least one artifact, the command to be executed, and the parameters that will become available after the launch thereof. The file of the at least one artifact may further provide a capability of referring to other script files by their names.

Also, all data blocks may have a digital signature, which can further be used, by the processor 401, to receive, in the computer system 160, information about the at least one artefact for updating thereof, which will be described in greater detail below.

The method 200 thus proceeds to step 220.

Step 220: Receiving, by the Processor, an Indication of at Least One Interaction of a Given Application with the at Least One Artefact Having installed the at least one artefact in the computer system 160, at step 220, in some non-limiting embodiments of the present technology, the processor 401 can further be configured to monitor, through the event capturing module 140, processes running in the computer system 160 for an indication of at least one interaction of the given application with the at least one artefact simulating the sandbox environment.

For example, as described above, the processor 401 can be configured to determine that the given application is requesting the number of files stored on the desktop of the computer system 160. In another example, where the at least one artefact is the passive artefact, such as the one or more files stored at the predetermined directories of the computer system 160, the processor 401 can be configured to determine if the given application is requesting (or otherwise determining) names and/or contents of those files.

Thus, in response to determining the indication of the at least one interaction of the given application with the at least one artefact, according to certain non-limiting embodiments of the present technology, the processor 401 may further be configured to analyze further activity of the given application, after having interacting with the at least artefact in the computer system 160, as will be described below.

However, in alternative non-limiting embodiments of the present technology, the method 200 may terminate at step 210, since it is assumed that adding the at least one artifact to the computer system 160 may prevent the activity of the malware application, which, as mentioned above, may result in at least one of the first type event and the second type event triggered by the malware application in the computer system 160. That is, the present technology is not limited only to the steps described herein and the sequence of execution thereof, but also includes at least separate execution of said steps, as well as change in the order of execution thereof, removal of any elements or addition of alternative ones with functionalities similar to those described.

The method 200 hence advances to step 230.

Step 230: Analyzing, by the Processor, an Activity of the Given Application to Detect at Least One of a First Type Event and a Second Type Event Triggered Thereby after Executing the at Least One Interaction As alluded to above, at step 230, in some non-limiting embodiments of the present technology, in response to receiving the indication of the at least one interaction of the given application with the at least one artefact of the sandbox environment, the processor 401 can further be configured to analyze the further activity of the given application in the computer system 160.

For example, in some non-limiting embodiments of the present technology, the processor 401 can be configured to determine if the given application, after interacting with the at least one artefact triggers at least one of the first type event and the second type event. As also mentioned above, in some non-limiting embodiments of the present technology, the first type event may be an abnormal termination of the given application, where the given application abruptly abort any further activity thereof, and the second type event may be changing a manner of executing the further activity, from that according to a predetermined manner of executing the further activity associated with the given application. For example, the predetermined manner of executing the further activity may be an expected manner of executing the further activity by the given applicating after the interacting with the at least one artefact, the expected manner having been predetermined, for example, based on a type of the given application, its history of running in the computer system 160, and the like.

Figure 3:
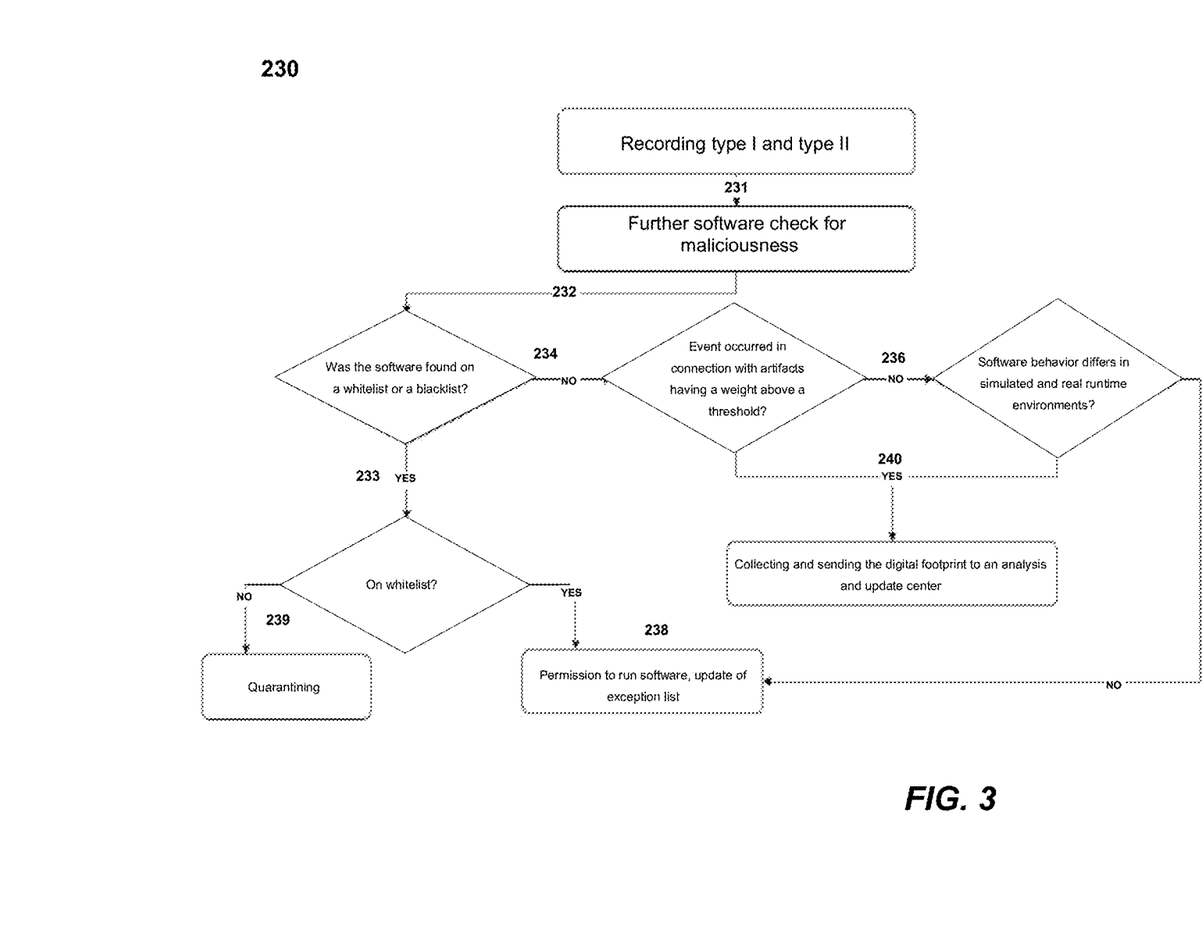
FIG. 3 depicts a flowchart of a step of the method of FIG. 2 for performing further checks for maliciousness of a given application running in the system of FIG. 1, in accordance with certain non-limiting embodiments of the present technology.

With reference to FIG. 3, there is depicted a flowchart diagram of step 230 of the method 200 illustrating a process for detecting, by the processor 401, of the at least one of the first type event and the second type event, in accordance with certain non-limiting embodiments of the present technology.

As already described above, certain prior art methods of protecting computing devices from malware are based on the detection of signatures and behaviors that indicate maliciousness. However, for preventing activity of the malware applications and/or deactivating them, the present technology is based on use of anti-debugging functions of malware applications, which allows detecting the malware applications even if they have not been detected by antivirus software applications installed on the computer device, as an example. However, it should be noted that legitimate software (mot malicious software) may also trigger counteractions, that is the at least one of the first type event and the second type event. For example, detecting working artifacts in the computer system 160 by the legitimate software may trigger a notification pointing to the fact that the application cannot be launched in the sandbox environment, whereas the malware application would shut down or terminate. For this reason, in the non-limiting embodiments of the present technology, the presence of such behavior of software running in the sandbox environment serves as an indicator that the given application may be malicious.

Thus, in some non-limiting embodiments of the present technology, the processor can further be configured to conduct additional checks of the given application for maliciousness, as will be immediately described below.

In one example, in some non-limiting embodiments of the present technology, the processor 401 can be configured to verify the given application triggered the at least one of the first type event and the second type using blacklists and whitelists of software (step 232) obtained, for example, from the server 130. In alternative embodiments, the blacklists and the whitelists may be configured by a user in the computer system 160.

In some non-limiting embodiments of the present technology, the server 130 may be configured to update the blacklists and whitelists received from the server 130 from time to time (for example, at a predetermined frequency) by comparing the analysis results and accumulating knowledge about the behavior of the software in other computing systems communicating with the server 130.

Thus, in some non-limiting embodiments of the present technology, the processor 401 can be configured to check associated with the given application having triggered the at least one of the first type event and the second type event may be checked by comparing a file identifier associated with the given application, in which the file name is encrypted, its hash sum and a path with a list of executable file identifiers that are present on either one of the whitelist or the blacklist, and the like. If the file identifier associated with the given application is identified as being whitelisted, the processor 401 may be configured such that the simulation of the sandbox environment does not affect the execution of the given application, that is, it should be added to the exclusion list (step 238). If the file is identified as blacklisted, the processor 401 may be configured to determine the given application as being the malware application; and further generate a notification about the malicious activity in the computing system 160. In additional non-limiting embodiments of the present technology, the processor 401 can further be configured to place the given application thus identified as being the malware application in quarantine (step 239).

If the given application has not been identified in any of the lists, the at least one of the first type event and the second type event is recorded, and the method 200 further proceeds to step 234.

Thus, at step 234, the processor 401 can be configured to determine if a predetermined weight associated with the at least one artefact, with which the given application interacted, is greater or lower a predetermined weight threshold.

For example, if the predetermined weight associated with the at least one artefact is below the predetermined weight threshold, the processor 401 may be configured to determine that the given application is the legitimate application and further proceed to step 238.

It should be noted that in non-limiting embodiments of the present technology, predetermined weight of the at least one artifact may be predetermined based on test samples. Since all artifacts are unbalanced (i.e. have different weights), the processor 401 can be configured to determine, for at least one artifact, at least one of the following: completeness, i.e. to what extent at least one artifact is implemented in the computer system 160 (for example, the registry keys have values only for HKLM\SOFTWARE\Vmware Inc.\Vmware Tools), relevance of a current version of at least one artifact (date of the last update), and an accuracy of the result obtained when the at least one artifact is running, i.e. what percentage of malware reacts to the at least one artifact with triggering the at least one of the first type event and the second type event. The resulting weight for each type of the above-listed data may then be calculated based on the obtained completeness and accuracy data (for example, as 0.5* arithmetic means of completeness and accuracy*completeness*accuracy).

Further, the processor 401 can be configured to compare the predetermined weight of at least one artifact installed in the computer system 160 with the predetermined weight threshold, the predetermined weight threshold having been predetermined based on test samples generated by those skilled in the art or using machine learning technology.

Thus, some embodiments of the present technology provide an additional check of the conformity of the at least one of the first type event and the second type event. In particular, step 236 may comprise a comparison of the behavior of the given application in the context of the computer system 160 and the sandbox environment. By way of example, in some non-limiting embodiments of the present technology, at step 236, the processor 401 may be configured to disable the at least one artifact so that the mechanism for protecting the given application from the sandbox environment can be disabled. If the given application does not show any behavioral reaction, that is, there are no counteraction events to the artifacts launched in the computer system 160, then the given application 160 can be identified as the legitimate software or at least as one having a low probability of being malicious. If the given application is legitimate, it is expected that it will either display a notification pointing to the fact that it cannot run in the sandbox environment, as mentioned above, or exhibit the same behavior regardless of the environment (step 238). If the given application is the malware application, the processor 401 may thus be configured to record the at least one of the first type event and the second type event in the simulated sandbox environment, whereas no such events will be recorded in the real environment (step 240).

Further, it is worth noting that each of the checks performed at step 231 may be performed separately or in combination with others in any sequence, for example, in one particular case, all the steps of further checks 232-236 may be performed, whereas in other non-limiting embodiments of the present technology, when the given application is identified on one of the whitelist and the blacklist, the execution of checks ends at step 232.

The method then proceeds to step 240.

Step 240: In Response to the Analyzing Rendering a Positive Result: Identifying the Given Application as being the Malware Application; and Using Data Indicative of a Digital Footprint of the Given Application in the Computer System for Updating the at Least One Artefact for Further Preventing the Activity of the Malware Application As noted above, having determined, based on the analysis described at step 230, the further activity of the given application to be indicative of the given application being the malware application, the processor 401 can further be configured to identify the given application as being the malware application and further use data of a digital footprint thereof in the computer system 160 for updating artefacts, such as the at least one artefact, installed in the computer system 160 for further preventing malicious activities therein.

For example, the digital footprint collecting module 150 can be configured to collect the digital footprint of the given application in the computer system 160 including all events and checks that the given application has used to check the computer system 160 and that led to triggering the at least one of the first type event and the second type.

The digital footprint is thereafter sent to the server 130 for further analysis and update, which may thus be configured to:
  analyze the received digital footprint and generate descriptions of the corresponding artifacts;
  enriching an artifact database for updates of the sandbox environment;
  updating at least one of the blacklist and the whitelist;
  sending artifact updates for the simulated sandbox environment to computer system 160.

For example, when running on the computer system 160 of the user, the GravityRAT malware may check the computer system 160 in which it is running for the sandbox environment by searching for hypervisor tools, checking the BIOS version, the number of cores, and using other standard methods, as well as using a WMI query to check the current processor temperature (MSAcpi_ThermalZoneTemperature record). All these collected data of the digital footprint may further be redirected to the server 130 for further analysis and update, where the server 130 may be configured to determine that, for example, a WMI query helps the malware application to detect the sandbox environment.

Further, the server 130 may further be configured to maintain the artifacts up to date by monitoring data from at least one of the following subsystems of the computer system 160: a file system, a list of running processes, and the system registry. Further, the server 130 can further be configured to update a status of the at least one artifact, the status including at least one of: adding, removing, and modifying.

It should be noted that the processor 401 can be configured to send the digital footprint of the given application thus identified as being the malware application to the server 130 in encrypted form via communication channels of the network 120.

Further, the server 130 may be configured to generate detailed analytical reports on the received digital footprints.

Further, the server 130 may be configured to blacklist or whitelist the given application, as well as send the so generated blacklist and/or whitelist over the network 120.

The method 200 hence terminates.

Computing Environment

Figure 4:
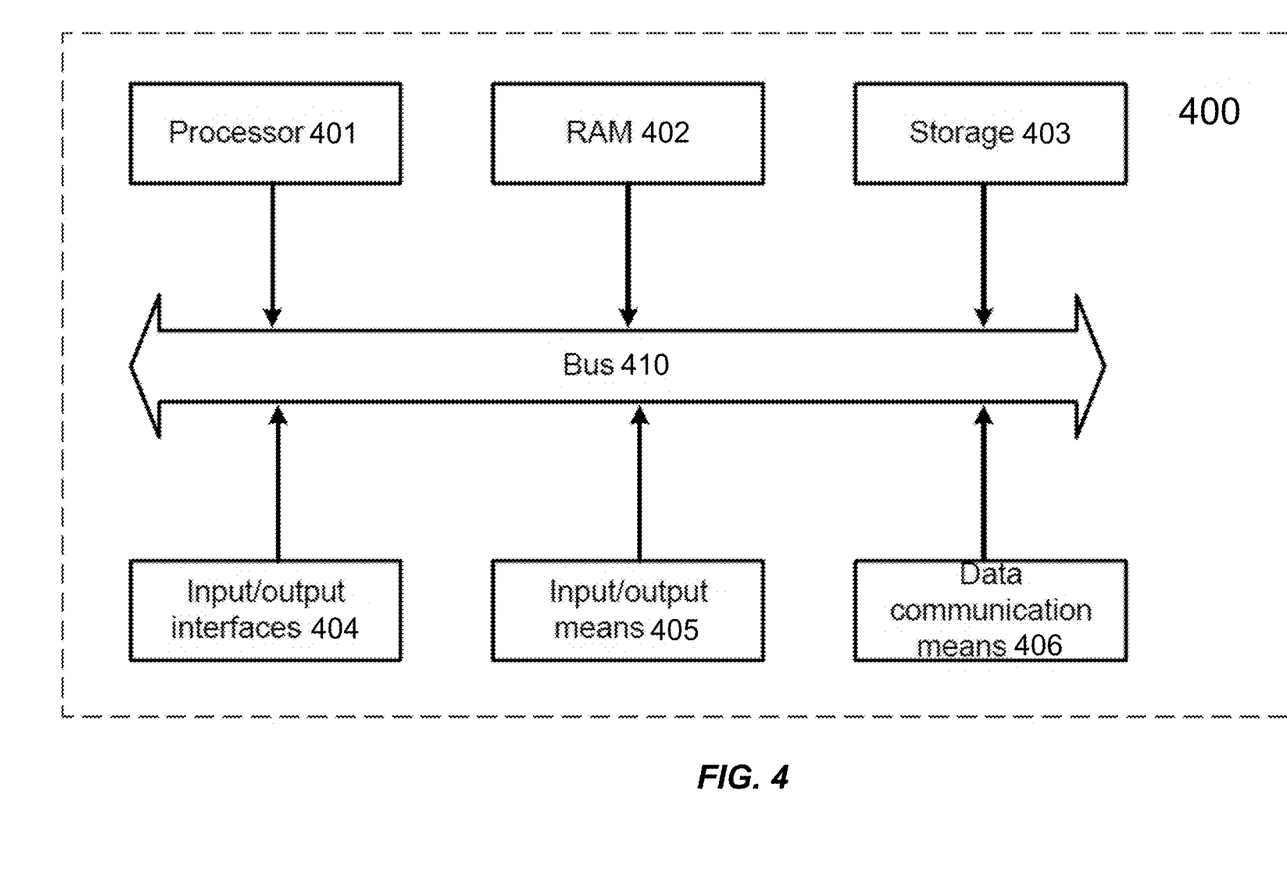
FIG. 4 depicts a schematic diagram of an example computing environment configurable for executing the method of FIG. 2, in accordance with certain non-limiting embodiments of the present technology.

With reference to FIG. 4, there is depicted an example functional diagram of the computing environment 400 configurable to implement certain non-limiting embodiments of the present technology including the method 200 described above.

In some non-limiting embodiments of the present technology, the computing environment 400 may include: the processor 401 comprising one or more central processing units (CPUs), at least one non-transitory computer-readable memory 402 (RAM), a storage 403, input/output interfaces 404, input/output means 405, data communication means 406.

According to some non-limiting embodiments of the present technology, the processor 401 may be configured to execute specific program instructions the computations as required for the computing environment 400 to function properly or to ensure the functioning of one or more of its components. The processor 401 may further be configured to execute specific machine-readable instructions stored in the at least one non-transitory computer-readable memory 402, for example, those causing the computing environment 400 to execute the method 200.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 402 may be implemented as RAM and contains the necessary program logic to provide the requisite functionality.

The storage 403 may be implemented as at least one of an HDD drive, an SSD drive, a RAID array, a network storage, a flash memory, an optical drive (such as CD, DVD, MD, Blu-ray), etc. The storage 403 may be configured for long-term storage of various data, e.g., the aforementioned documents with user data sets, databases with the time intervals measured for each user, user IDs, etc.

The input/output interfaces 404 may comprise various interfaces, such as at least one of USB, RS232, RJ45, LPT, COM, HDMI, PS/2, Lightning, FireWire, etc.

The input/output means 405 may include at least one of a keyboard, joystick, (touchscreen) display, projector, touchpad, mouse, trackball, stylus, speakers, microphone, and the like. A communication link between each one of the input/output means 405 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 406 may be selected based on a particular implementation of the network, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 400 may be linked together using a common data bus 410.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for preventing an activity of a malware application in a computer system, the method being executable by a processor of the computer system, the method comprising:
   receiving, by the processor, at least one artefact that is indicative of an execution of a sandbox environment in the computer system, the sandbox environment including a virtual machine;
   causing, by the processor, installation of the at least one artefact of the sandbox environment in the computer system for simulating the sandbox environment in the computer system without actually executing the sandbox environment;
   receiving, by the processor, an indication of at least one interaction of a given application with the at least one artefact;
   analyzing, by the processor, an activity of the given application to detect at least one of a first type event and a second type event triggered thereby after executing the at least one interaction,
      the first type event being the given application aborting execution of any activity after the at least one interaction with the at least one artefact; and
      the second type event being the given application executing the activity thereof in a manner different from a predetermined manner of executing the activity associated with the given application;
   in response to the analyzing rendering a positive result by detecting the at least one of the first type event and the second type event:

identifying the given application as being the malware application; and using data indicative of a digital footprint of the given application in the computer system for updating the at least one artefact for further preventing the activity of the malware application.

2. The method of claim 1, wherein the at least one artefact comprises at least one of:
one or more files to be created at predetermined paths in the system;
one or more language packs to be added to the computer system without adding corresponding keyboard layouts;
one or more idle network interfaces with names, IP, and MAC addresses having predetermined names to be generated in the computer system;
one or more idle processes to be launched at predetermined paths and under predetermined names;
one or more predetermined keys to be added in a system register of the computer system;
one or more predetermined respective interface elements to be generated and added to at least one of a launch menu and a quick launch panel of the computer system; and
one or more environment variables associated with the sandbox environment to be registered with the computer system.

3. The method of claim 1, wherein the at least one artifact is one of:
an active artefact configured to interact with at least one application running in the computer system; and
a passive artefact incapable of interacting with any application running therein.

4. The method of claim 1, wherein the analyzing further comprises determining if the given application is the malware application, the determining including at least one of: searching for the given application on one of a whitelist and a blacklist of applications; determining if a predetermined respective weight of the at least one artefact, associated with triggering the at least one of the first type event and the second type event, exceeds a predetermined weight threshold; and determining at least one difference in behaviors of the given application in the sandbox environment and in the computer system.

5. The method of claim 1, further comprising transmitting, via a communication network, the data indicative of the digital footprint of the given application to an analysis and update server, the transmitting being executed in an encrypted form.

6. The method of claim 5, wherein the analysis and update server is configured to execute at least one of:
analyzing the digital footprint of the given application;
adding the at least one artefact to an artifact database associated with the sandbox environment; and
transmitting updates of the artifact database to the computer system.

7. The method of claim 1, wherein the at least one artifact is being updated based on monitoring data from at least one of the following subsystems: a file system, a list of running processes, and a registry; and the method further comprises updating a status of the at least one artifact, the status including at least one of: adding, removing, and modifying.

8. The method of claim 5, wherein the receiving of the at least one artefact is from the analysis and update server.

9. A computer system for preventing an activity of a malware application therein, the computer system including:

a processor;
a non-transitory computer-readable memory storing instructions;
the processor, upon executing the instructions, being configured to:
receive at least one artefact that is indicative of an execution of a sandbox environment in the computer system, the sandbox environment including a virtual machine:
cause installation of the at least one artefact of the sandbox environment in the computer system for simulating the sandbox environment in the computer system without actually executing the sandbox environment;
receive an indication of at least one interaction of a given application with the at least one artefact;
analyze an activity of the given application to detect at least one of a first type event and a second type event triggered thereby after executing the at least one interaction,
the first type event being the given application aborting execution of any activity after the at least one interaction with the at least one artefact; and
the second type event being the given application executing the activity thereof in a manner different from a predetermined manner of executing the activity associated with the given application;
in response to the analyzing rendering a positive result by detecting the at least one of the first type event and the second type event:
identify the given application as being the malware application; and
use data indicative of a digital footprint of the given application in the computer system for updating the at least one artefact for further preventing the activity of the malware application.

10. The computer system of claim 9, wherein the at least one artefact comprises at least one of:
one or more files to be created at predetermined paths in the system;
one or more language packs to be added to the computer system without adding corresponding keyboard layouts;
one or more idle network interfaces with names, IP, and MAC addresses having predetermined names to be generated in the computer system;
one or more idle processes to be launched at predetermined paths and under predetermined names;
one or more predetermined keys to be added in a system register of the computer system;
one or more predetermined respective interface elements to be generated and added to at least one of a launch menu and a quick launch panel of the computer system; and
one or more environment variables associated with the sandbox environment to be registered with the computer system.

11. The computer system of claim 9, wherein the at least one artifact is one of:
an active artefact configured to interact with at least one application running in the computer system; and
a passive artefact incapable of interacting with any application running therein.

12. The computer system of claim 9, wherein the processor, configured to analyze the activity of the given application, is further configured to determine if the given application is the malware application, by executing at least one of: searching for the given application on one of a whitelist and a blacklist of applications; determining if a predetermined respective weight of the at least one artefact, associated with triggering the at least one of the first type event and the second type event, exceeds a predetermined weight threshold; and determining at least one difference in behaviors of the given application in the sandbox environment and in the computer system.

13. The computer system of claim 9, wherein the processor is further configured to transmit, via a communication network, in an encrypted form, the data indicative of the digital footprint of the given application to an analysis and update server.

14. The computer system of claim 13, wherein the analysis and update server is configured to execute at least one of:
  analyzing the digital footprint of the given application;
  adding the at least one artefact to an artifact database associated with the sandbox environment; and
  transmitting updates of the artifact database to the computer system.

15. The computer system of claim 9, wherein the at least one artifact being updated based on monitoring data from at least one of the following subsystems: a file system, a list of running processes, and a registry; and the processor is further configured to update a status of the at least one artifact, the status including at least one of: adding, removing, and modifying.

16. The computer system of claim 13, wherein the processor is configured to receive the at least one artefact from the analysis and update server.

\* \* \* \* \*